United States Patent
Nonomura et al.

(10) Patent No.: US 6,525,742 B2
(45) Date of Patent: Feb. 25, 2003

(54) VIDEO DATA PROCESSING DEVICE AND VIDEO DATA DISPLAY DEVICE HAVING A CPU WHICH SELECTIVELY CONTROLS EACH OF FIRST AND SECOND SCALING UNITS

(75) Inventors: Itaru Nonomura, Tokyo (JP); Yasuhiro Furukawa, Yokohama (JP); Kazushige Hiroi, Yokohama (JP); Akio Hayashi, Tokyo (JP)

(73) Assignees: Hitachi, Ltd., Tokyo (JP); Hitachi Video and Information Systems Inc., Yokohama (JP)

( * ) Notice: Subject to any disclaimer, the term of this patent is extended or adjusted under 35 U.S.C. 154(b) by 0 days.

(21) Appl. No.: 09/785,319

(22) Filed: Feb. 20, 2001

(65) Prior Publication Data

US 2001/0005233 A1 Jun. 28, 2001

Related U.S. Application Data

(63) Continuation of application No. 08/919,329, filed on Aug. 28, 1997, now Pat. No. 6,219,030.

(30) Foreign Application Priority Data

Aug. 30, 1996 (JP) ............................................. 08-229570

(51) Int. Cl.[7] .............................. G09G 5/02; G09G 5/36
(52) U.S. Cl. ........................ 345/603; 547/501; 547/660
(58) Field of Search ................................. 345/503, 520, 345/600, 603–605, 629, 632, 636, 660, 668, 670, 671

(56) References Cited

U.S. PATENT DOCUMENTS

| | | | |
|---|---|---|---|
| 5,543,850 A | 8/1996 | Pratt et al. ................... 348/617 |
| 5,563,804 A | 10/1996 | Mortensen et al. ..... 395/200.36 |
| 5,666,548 A | 9/1997 | Grimm ................... 395/800.01 |
| 5,675,390 A | 10/1997 | Schindler et al. ............ 345/327 |
| 5,742,350 A | 4/1998 | Pan et al. ..................... 348/453 |
| 5,745,184 A | 4/1998 | Neal ............................ 348/468 |
| 5,751,280 A | 5/1998 | Abbott et al. ................ 345/302 |
| 5,777,601 A | 7/1998 | Baker et al. ................. 345/154 |
| 5,805,173 A * | 9/1998 | Glennon et al. ............. 345/501 |
| 5,808,630 A | 9/1998 | Pannell ........................ 345/514 |
| 5,812,144 A | 9/1998 | Potu et al. ................... 345/439 |
| 5,831,592 A | 11/1998 | Cahill, III .................... 345/127 |
| 5,838,385 A * | 11/1998 | Reder et al. ................. 348/448 |
| 5,844,541 A * | 12/1998 | Cahill, III .................... 345/603 |
| 5,999,189 A | 12/1999 | Kajiya et al. ................ 345/430 |
| 6,157,414 A * | 12/2000 | Sakamoto .................... 348/445 |
| 6,348,925 B1 * | 2/2002 | Potu ............................ 345/537 |

OTHER PUBLICATIONS

S. Koichi, *Patent Abstracts of Japan*, 07–123374, May 12, 1995.

* cited by examiner

*Primary Examiner*—Ulka J. Chauhan
(74) *Attorney, Agent, or Firm*—Antonelli,Terry,Stout & Kraus, LLP

(57) ABSTRACT

A video data processing device which includes a bus, a central processing unit (CPU), a first scaling unit which is coupled to the bus and has an input unit for inputting image data from an external device, and a second scaling unit which is coupled to the bus. The CPU selectively controls the first scaling unit to convert the image data when an amount of the image data is decreased by a conversion performed by the first scaling unit, and selectively controls the second scaling unit to convert the image data when an amount of the image data is increased by the conversion performed by the first scaling unit.

6 Claims, 13 Drawing Sheets

| HORIZONTAL LINE No. | TRANSFER SIZE | HEAD FORWARDING ADDRESS | |
|---|---|---|---|
| 14 | 280 | 00100000 | 901 |
| ........ | ........ | ........ | |
| 21 | 280 | 00100000 | |
| 22 | 280 | 00800000 | |
| ........ | ........ | ........ | |
| 263 | 280 | 00825800 | |

FIG. 10

804 DATA TRANSFER CONTROL UNIT

- 1003 COLOR FORMAT CONVERSION UNIT
- ADDRESS GENERATOR
  - 1008 COUNTER
  - 1005 SELECTOR
  - 1006 ADDRESS REGISTER
  - 1007 +
- 1001 CONTROL PLANE READ-OUT CONTROL UNIT
- 1002 ADDRESS INITIALIZATION CONTROL UNIT
- 1004 BUFFER

507 BUS

- 502 MAIN MEMORY
- 503 GRAPHIC DISPLAY BOARD

FIG. 11a

| HORIZONTAL LINE No. | 14 | 15 | 16 | 17 | 18 | 19 | 20 | 21 |
|---|---|---|---|---|---|---|---|---|
| TRANSFER ON/OFF (0=OFF, 1=ON) | | | | | | | | |

FIG. 11b

| HORIZONTAL LINE No. | 277 | 278 | 279 | 280 | 281 | 282 | 283 | 284 |
|---|---|---|---|---|---|---|---|---|
| TRANSFER ON/OFF (0=OFF, 1=ON) | | | | | | | | |

| HORIZONTAL LINE No. | TRANSFER SIZE | HEAD FORWARDING ADDRESS | |
|---|---|---|---|
| 14 | 280 | 00100000 | —1401 |
| ........ | ........ | ........ | —1402 |
| 21 | 280 | 00100000 | —1403 |
| 22 | 280 | 08000000 | —1404 |
| ........ | ........ | ........ | —1405 |
| 262 | 280 | 00825800 | —1406 |

FIG. 15

| HORIZONTAL LINE No. | TRANSFER SIZE | HEAD FORWARDING ADDRESS | |
|---|---|---|---|
| 277 | 280 | 00100000 | 1501 |
| ........ | ........ | ........ | 1502 |
| 284 | 280 | 00100000 | 1503 |
| 285 | 1E0 | 00110000 | 1504 |
| ........ | ........ | ........ | 1505 |
| 525 | 1E0 | 0011C020 | 1506 |

FIG. 16a

| HORIZONTAL LINE No. | 14 | 15 | 16 | 17 | 18 | 19 | 20 | 21 |
|---|---|---|---|---|---|---|---|---|
| TRANSFER ON/OFF (0=OFF, 1=ON) | 0 | 0 | 0 | 0 | 0 | 0 | 0 | 0 |

FIG. 16b

| HORIZONTAL LINE No. | 277 | 278 | 279 | 280 | 281 | 282 | 283 | 284 |
|---|---|---|---|---|---|---|---|---|
| TRANSFER ON/OFF (0=OFF, 1=ON) | 0 | 0 | 0 | 0 | 0 | 0 | 0 | 0 |

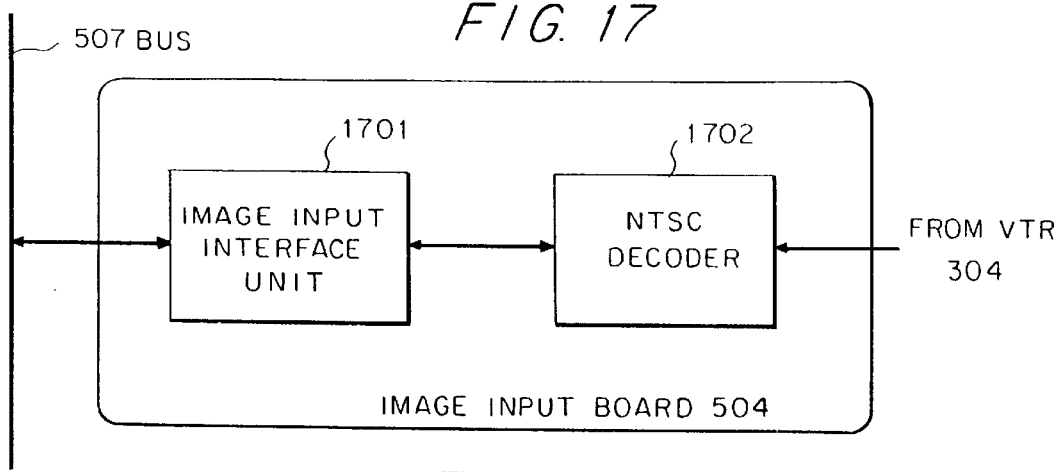
FIG. 17
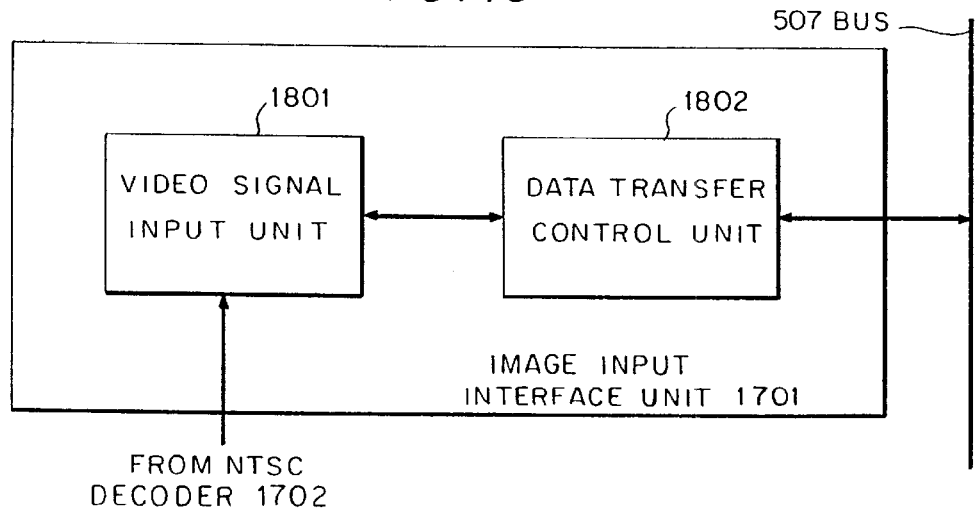
FIG. 18
FIG. 19
| HORIZONTAL LINE No. | TRANSFER SIZE | HEAD FORWARDING ADDRESS | |
|---|---|---|---|
| 14 | 280 | 00100000 | 1901 |
| ........ | ........ | ........ | 1902 |
| 21 | 280 | 00100000 | 1903 |
| 22 | 500 | 08000000 | 1904 |
| ........ | ........ | ........ | 1905 |
| 262 | 500 | 0084B000 | 1906 |

| HORIZONTAL LINE No. | 14 | 15 | 16 | 17 | 18 | 19 | 20 | 21 |
|---|---|---|---|---|---|---|---|---|
| TRANSFER ON/OFF (0=OFF, 1=ON) | 1 | 1 | 1 | 0 | 0 | 0 | 0 | 1 |

| HORIZONTAL LINE No. | 277 | 278 | 279 | 280 | 281 | 282 | 283 | 284 |
|---|---|---|---|---|---|---|---|---|
| TRANSFER ON/OFF (0=OFF, 1=ON) | 0 | 0 | 0 | 0 | 0 | 0 | 0 | 0 |

FIG. 22a

| HORIZONTAL LINE No. | 14 | 15 | 16 | 17 | 18 | 19 | 20 | 21 |
|---|---|---|---|---|---|---|---|---|
| TRANSFER ON/OFF (0=OFF, 1=ON) | 1 | 1 | 1 | 0 | 0 | 0 | 0 | 1 |

FIG. 22b

| HORIZONTAL LINE No. | 277 | 278 | 279 | 280 | 281 | 282 | 283 | 284 |
|---|---|---|---|---|---|---|---|---|
| TRANSFER ON/OFF (0=OFF, 1=ON) | 1 | 1 | 1 | 0 | 0 | 0 | 0 | 1 |

FIG. 23a

| HORIZONTAL LINE No. | 14 | 15 | 16 | 17 | 18 | 19 | 20 | 21 |
|---|---|---|---|---|---|---|---|---|
| TRANSFER ON/OFF (0=OFF, 1=ON) | 0 | 0 | 0 | 0 | 0 | 0 | 0 | 1 |

FIG. 23b

| HORIZONTAL LINE No. | 277 | 278 | 279 | 280 | 281 | 282 | 283 | 284 |
|---|---|---|---|---|---|---|---|---|
| TRANSFER ON/OFF (0=OFF, 1=ON) | 0 | 0 | 0 | 0 | 0 | 0 | 0 | 0 |

FIG. 24a

| HORIZONTAL LINE No. | 14 | 15 | 16 | 17 | 18 | 19 | 20 | 21 |
|---|---|---|---|---|---|---|---|---|
| TRANSFER ON/OFF (0=OFF, 1=ON) | 0 | 0 | 0 | 0 | 0 | 0 | 0 | 0 |

FIG. 24b

| HORIZONTAL LINE No. | 277 | 278 | 279 | 280 | 281 | 282 | 283 | 284 |
|---|---|---|---|---|---|---|---|---|
| TRANSFER ON/OFF (0=OFF, 1=ON) | 0 | 0 | 0 | 0 | 0 | 0 | 0 | 0 |

VIDEO DATA PROCESSING DEVICE AND VIDEO DATA DISPLAY DEVICE HAVING A CPU WHICH SELECTIVELY CONTROLS EACH OF FIRST AND SECOND SCALING UNITS

This is a continuation of application Ser. No. 08/919,329, filed Aug. 28, 1997 now U.S. Pat. No. 6,219,030.

BACKGROUND OF THE INVENTION

The present invention relates to a video data processing device and a video data display device suitable for displaying images or character information contained in video signals on a display device for computers such as a personal computer and a work station.

In recent years, the expectation of multimedia technique has risen, and there has increased the need of superimposing images of video signals for television, etc. for displaying on a graphic display screen for computers such as a personal computer (hereinafter, abbreviated to "PC"), and a work station (hereinafter, abbreviated to "WS"). Image display devices for realizing the need have also been developed and on sale.

Further in recent years, a PC obtained by incorporating a television tuner in addition to a mechanism of superimposing images of video signals on a graphic display screen has been on sale as a "personal computer in which television can be seen".

There exist plenty of systems of superimposing image thus contained in video signals on a graphic screen for computers.

Recently, since buses (for example, PCI bus) having fast transfer velocity capable of transferring tremendous digital image data on real-time basis are being spread with PC or WS, there has been developed a system (hereinafter, referred to as "direct transfer system") for displaying images by transferring digitized video signals to a memory for graphic display for PC or WS through bus.

With this direct transfer system, an image can be displayed only by transferring data through bus once and therefore, it is possible to transfer a large quantity of image data within unit time, and to display high-quality images.

In this respect, for detail of this direct transfer system, refer to the April 1996 issue of Interface Journal (on pages 102 to 109) published by CQ Publishing Company.

Also, in Japanese Patent Laid-Open Application No.6-124189, there is disclosed a technique of superimposing images in video signals on a graphic screen for displaying by using the direct transfer system.

On the other hand, some video signals contain character information in addition to images. For example, Closed Caption (hereinafter, abbreviated to "CC") standardized by FCC (Federal Communications Commission) in the United States is a system of multiplexing character information such as captions in addition to images.

In the United States, they are multiplexing, to video signals, character information related to screen by using this CC system for persons who have difficulty in hearing. Particularly, as from Apr. 1, 1993, the law obliged all television sets of 13 inch or more sold in the United States to correspond to the CC system.

With the CC system, character information is multiplexed to the area of a period which is not displayed in a screen called a "vertical blanking interval" among video signals. For this reason, character information multiplexed by the CC system is not displayed on the screen in television sets, etc. having no decoder of the CC system, but when a television set in which a decoder of the CC system is incorporated receives video signals with character information multiplexed, the captions can be seen together with images.

Currently, there are television sets etc., on the market, which are capable of displaying, on the screen, characters obtained by decoding character information multiplexed to video signals by using the CC system. And there are also a decoding device or VTR (Video Tape Recorder), on the market, having a function to multiplex character information for outputting, which is multiplexed to video signals by the CC system, to images likewise contained in the video signals.

The technique related to the above described in the Interface Journal or the technique disclosed in the Japanese Patent Laid-Open Application No.6-124189 had the problem that no consideration has been paid to character information contained in video signals.

This is because the appropriate treating methods in PC are different between video data such as images and data of character information.

Generally, video data such as images have a large amount of data, and a load is applied to the system in the mode of execution in which CPU of computer interprets software, and therefore, exclusive hardware such as image board of MPEG board, etc. is mostly prepared. Also, when video data are transferred to CPU, there is also the problem that the traffic of bus increases to lower the performance of the entire system.

On the other hand, the character information has smaller amount of data than the video data, and is suitable for the mode of execution in which CPU interprets software. Processing of this character information by the use of exclusive hardware has the problem that the device will be larger in size and expensive. Also, preparation of the respective exclusive hardware every time character information is processed has the problem that it lacks flexibility. Further, the use of the exclusive hardware has the problem that the power consumption will be high.

When images and characters are thus superimposed on a graphic display screen, there is the problem that the processes for video data and character information data must be properly divided into a process by the exclusive hardware and a process in which CPU interprets the software for execution.

SUMMARY OF THE INVENTION

The object of the present invention is to provide a video data processing device and a video data display device which are small-sized, low-priced and have less power consumption without lowering the display performance as the entire system in such a manner that when video data such as images and character information are superimposed to display on a graphic display screen, an appropriate process can be performed in accordance with the property of the data.

In order to achieve the aforesaid object, a video data processing device according to the present invention is constructed such that in a video data processing device for inputting video data consisting of vertical blanking interval data and other image data than vertical blanking interval for processing, the device comprises video data inputting means for inputting the aforesaid video data, and data transfer means capable of transferring the vertical blanking interval data and other image data than the vertical blanking interval, of the aforesaid video data, to different devices from each other so that the aforesaid vertical blanking interval data and the other image data than the vertical blanking interval can be processed individually.

More specifically, the video data processing device comprises scaling means for scaling the video data at a designated scaling ratio, and color format conversion means for color format converting the video data with a designated color format so that the scaling means scales the vertical blanking interval data and other image data than the vertical blanking interval data, of the aforesaid video data, at scaling ratios different from each other, and the aforesaid color format conversion means color format converts the vertical blanking interval data and other image data than the vertical blanking interval data, of the aforesaid video data, by means of color format conversion methods different from each other.

Specifically, in the video data processing device, which is a computer provided with a processor, a main memory and a graphic display memory, the data transfer means DMA (Direct Memory Access) transfers the vertical blanking interval data to the main memory, and the other image data than the vertical blanking interval to the graphic display memory respectively.

Further specifically, in the video data processing device, which is a computer provided with a processor, a main memory and a graphic display memory, the data transfer means DMA (Direct Memory Access) transfers the vertical blanking interval data to the main memory, and the other image data than the vertical blanking interval to the main memory and the graphic display memory respectively.

Further specifically, the data transfer means transfers, in the video data processing device, the vertical blanking interval data contained in the video data in preference to the image data of the vertical blanking interval data.

Next, in order to achieve the aforesaid object, a first configuration of a video data display device according to the present invention is such that, in the video data display device for inputting video data consisting of vertical blanking interval data and other image data than the vertical blanking interval for displaying, moreover the vertical blanking interval data having a format capable of containing character information, the device comprises video data inputting means for inputting the video data, data transfer means capable of transferring the vertical blanking interval data and other image data than the vertical blanking interval data, of the aforesaid video data, to different devices from each other, decoding means for decoding the vertical blanking interval data to generate character data, and display means for displaying the character data thus decoded.

More specifically, the video data display device comprises scaling means for scaling the video data at a designated scaling ratio, and color format conversion means for color format converting the video data with a designated color format so that the scaling means scales the vertical blanking interval data and other image data than the vertical blanking interval data, of the aforesaid video data, at scaling ratios different from each other, and the aforesaid color format conversion means color format converts the vertical blanking interval data and other image data than the vertical blanking interval data, of the aforesaid video data, by means of color format conversion methods different from each other.

Next, in order to achieve the aforesaid object, a second configuration of a video data display device according to the present invention is such that, in the video data display device for inputting video data consisting of vertical blanking interval data and other image data than the vertical blanking interval for displaying, moreover, the vertical blanking interval data having a format capable of containing character information, the device comprises video data inputting means for inputting the video data, data transfer means capable of transferring the vertical blanking interval data and other image data than the vertical blanking interval data, of the aforesaid video data, to different devices from each other, decoding means for decoding the vertical blanking interval data to generate character data, and storage means for storing the character data thus decoded.

Also specifically, the video data display device comprises scaling means for scaling the video data at a designated scaling ratio, and color format conversion means for color format converting the video data with a designated color format so that the scaling means scales the vertical blanking interval data and other image data than the vertical blanking interval data, of the aforesaid video data, at scaling ratios different from each other, and the aforesaid color format conversion means color format converts the vertical blanking interval data and other image data than the vertical blanking interval data, of the aforesaid video data, by means of color format conversion methods different from each other.

More specifically, the video data processing device has a processor, and the decoding means performs decoding when the processor interprets and executes the program.

Also, specifically, in the video data display device, the decoding means discriminates whether or not character information is contained in the vertical blanking interval data, and when character information is contained in the vertical blanking interval data, the decoding means controls the data transfer means so as to transfer the vertical blanking interval data. When no character information is contained in the vertical blanking interval data, it controls the data transfer means so as to stop the transfer of the vertical blanking interval data.

Further specifically, in the video data display device, the decoding means discriminates the classification of character information contained in the aforesaid vertical blanking interval data to control the data transfer means, transfers the vertical blanking interval data required to decode the character information contained in the vertical blanking interval data to control the data transfer means, and prevents vertical blanking interval data not required to decode the character information contained in the vertical blanking interval data from being transferred.

Next, in order to achieve the aforesaid object, a third configuration of a video data display device according to the present invention is such that, in the video data display device for inputting video data consisting of vertical blanking interval data and other image data than the vertical blanking interval for displaying, moreover, the vertical blanking interval data having a format capable of containing character information, the device comprises video data inputting means for inputting the video data; scaling means for scaling the vertical blanking interval data and other image data than the vertical blanking interval data, of the aforesaid video data, at scaling ratios different from each other; color format conversion means for color format converting the vertical blanking interval data and other image data than the vertical blanking interval data, of the aforesaid video data, by means of color format conversion methods different from each other; data transfer means capable of transferring the vertical blanking interval data and other image data than the vertical blanking interval data, of the aforesaid video data, to devices different from each other; and further graphic display means, the graphic display means including the color format conversion means for the video data and the scaling display means.

More specifically, in the video data display device, when the amount of the image data increases by means of color format conversion of the image data contained in the video data, the color format conversion is performed by the graphic display means. When the amount of the image data decreases or does not change by means of the color format conversion of the image data contained in the video data, the color format conversion is performed by the color format conversion means separately provided from the aforesaid graphic display means.

More specifically, in the video data display device, when the amount of the image data increases by means of scaling of the image data contained in the video data, scaling is performed by the graphic display means. When the amount of the image data decreases or does not change by means of scaling of the image data contained in the video data, scaling is performed by means of scaling means separately provided from the aforesaid graphic display means.

Further specifically, the data transfer means transfers, in the video data display device, the vertical blanking interval data contained in the video data in preference to the image data contained in the video data.

As described above, according to a video data processing device and a video data display device according to the present invention, image data contained in video signals are directly transferred to a graphic display memory, and character information data contained in video signals, to a main memory through bus respectively, and by further decoding and displaying the character information by means of CPU, it is possible to allocate a process on images and a process of displaying character information by taking into consideration balance as the system, and to make the device low-priced, and small-sized with low power consumption, and yet to display both high-quality graphics and images.

BRIEF DESCRIPTION OF THE DRAWINGS

The present invention will be more apparent from the following detailed description, when taken in conjunction with the accompanying drawings, in which:

FIG. 10 is a schematic view showing the configuration of the data transfer control unit 804;

FIG. 11 is a schematic view showing the configuration of the line transfer control register;

FIG. 15 is a schematic view showing a control plane for even field set in the embodiment according to the present invention;

FIG. 16 is a schematic view showing a transfer control register set in the embodiment according to the present invention;

FIG. 17 is a block diagram showing the configuration of an image input board according to another embodiment of the present invention;

FIG. 18 is a block diagram showing the configuration of an image input interface unit 1701 according to the other embodiment of the present invention;

FIG. 19 is a schematic view showing a control plane of an odd field executed in the other embodiment of the present invention;

FIG. 21 is a view showing a set value for a transfer control register according to the other embodiment of the present invention (Part 1);

FIG. 22 is a view showing a set value for a transfer control register according to the other embodiment of the present invention (Part 2);

FIG. 23 is a view showing a set value for a transfer control register according to the other embodiment of the present invention (Part 3); and FIG. 24 is a view showing a set value for a transfer control register according to the other embodiment of the present invention (Part 4).

DETAILED DESCRIPTION OF PREFERRED EMBODIMENT

Hereinafter, the description will be made of each embodiment according to the present invention with reference to FIGS. 1 to 24.

Multiplexing Character Information

First, before description of each embodiment of the present invention, the technique of multiplexing character information will be described with reference to FIGS. 1 and 2.

Concerning video signals in which character information has been multiplexed, the description will be made by exemplifying video signals of NTSC (National Television Systems Committee) system in which character information has been multiplexed by using the CC system.

Figure 1:
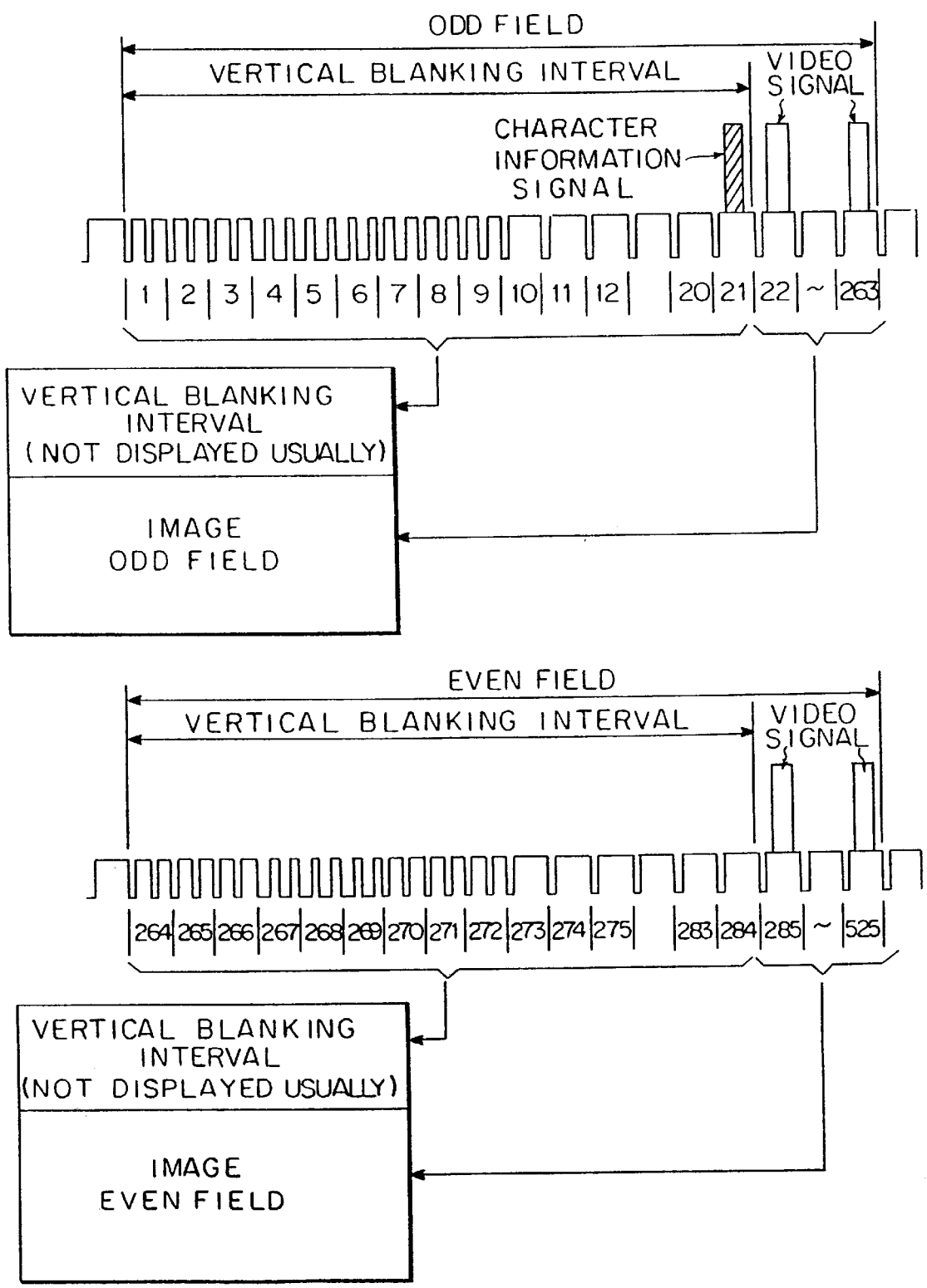
FIG. 1 is a schematic view showing the configuration in which NTSC system of video signals obtained by multiplexing character information by the CC system have been divided into an odd field and an even field.

FIG. 1 is a schematic diagram showing video signals of NTSC system, in which character information has been multiplexed by using the CC system, divided into odd field and even field.

A video signal of NTSC system is interlace, and consists of an odd field and an even field. Further, these odd and even fields can be roughly divided into vertical blanking interval signals and other signals than vertical blanking interval respectively as shown in FIG. 1.

According to the standard for CC system, character information has been determined to be multiplexed to a brightness signal of the 21st line, vertical blanking interval of each odd field.

Figure 2:
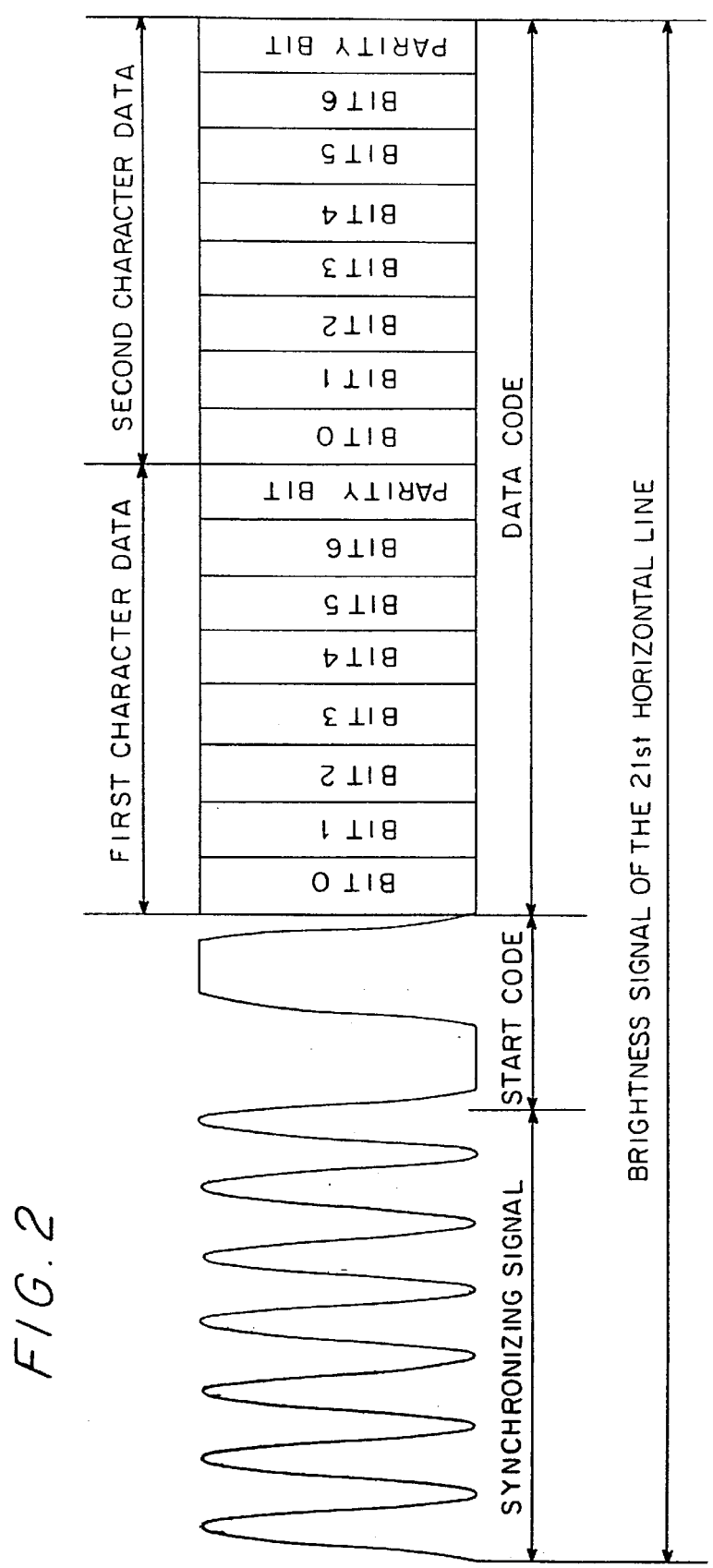
FIG. 2 is a schematic view showing the configuration of the 21st line of brightness signal obtained by multiplexing character information by the CC system.

Character information multiplexed by using this CC system consists of synchronizing signals, start code and data code as shown in FIG. 2. This data code has 16 bits, and data for one character consist of seven bits of data bit and one bit of parity bit. Accordingly, this multiplexed character information is to contain characters for two characters.

Hereinafter, the description will be made of an embodiment according to the present invention with reference to FIGS. 3 to 16. This embodiment shows an example in which video tape is played back, video signals, in which character information has been multiplexed by using CC system, are generated to display both the images and character information contained in the video signals on a display connected to PC by the use of a video data display device according to the present invention, and to record the images in the storage in the PC at the same time.

(I) Configuration of Image Display System according to an Embodiment of the Present Invention First, the description will be made of the configuration of an image display system according to the of the present invention with reference to FIGS. 3 and 4.

Figure 3:
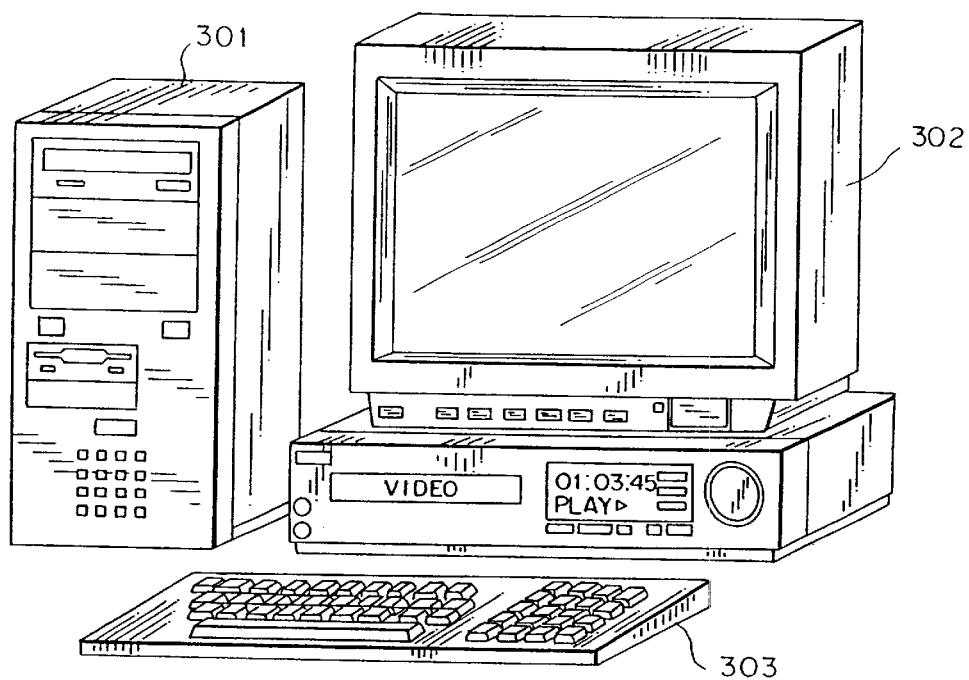
FIG. 3 is a perspective view showing an image display system according to an embodiment of the present invention.

FIG. 3 is a perspective view showing an image display system according to the embodiment of the present invention.

Figure 4:
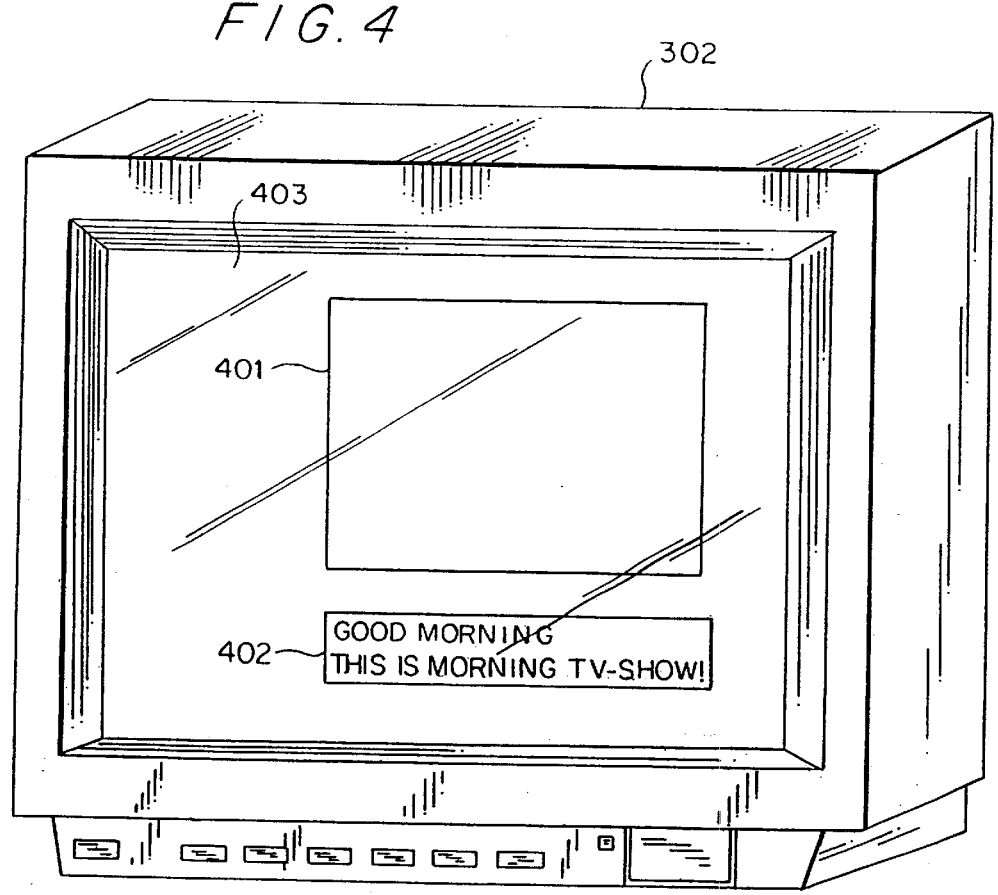
FIG. 4 is a perspective view showing a case where images and character information are displayed on the display 302 simultaneously.

FIG. 4 is a perspective view showing a case where images and character information are displayed on the display 302 simultaneously.

An image display system according to an embodiment of the present invention is composed of PC301, a display 302, a keyboard 303 and VTR304 as shown in FIG. 3.

The display 302 is a display device using CRT (Cathode Ray Tube), a liquid crystal panel or the like, and displays a display signal inputted from the PC301.

The keyboard 303 is operated by the user of this image display system, and the operation is converted into an electric signal, which is inputted to the PC301.

The VTR304 plays back the video tape to generate video signals, and outputs the video signals to the PC301.

In this embodiment, the PC301 displays, on the display 302, the images contained in the video signals outputted by the VTR304, and the character information multiplexed to the video signals by using CC system as described above.

At the time, the display screen on the display 302 is to be composed of an image display window 401, a character information display window 402, and other area 403 as shown in FIG. 4.

(II) PC301 and Configuration of its Each Component

Figure 5:
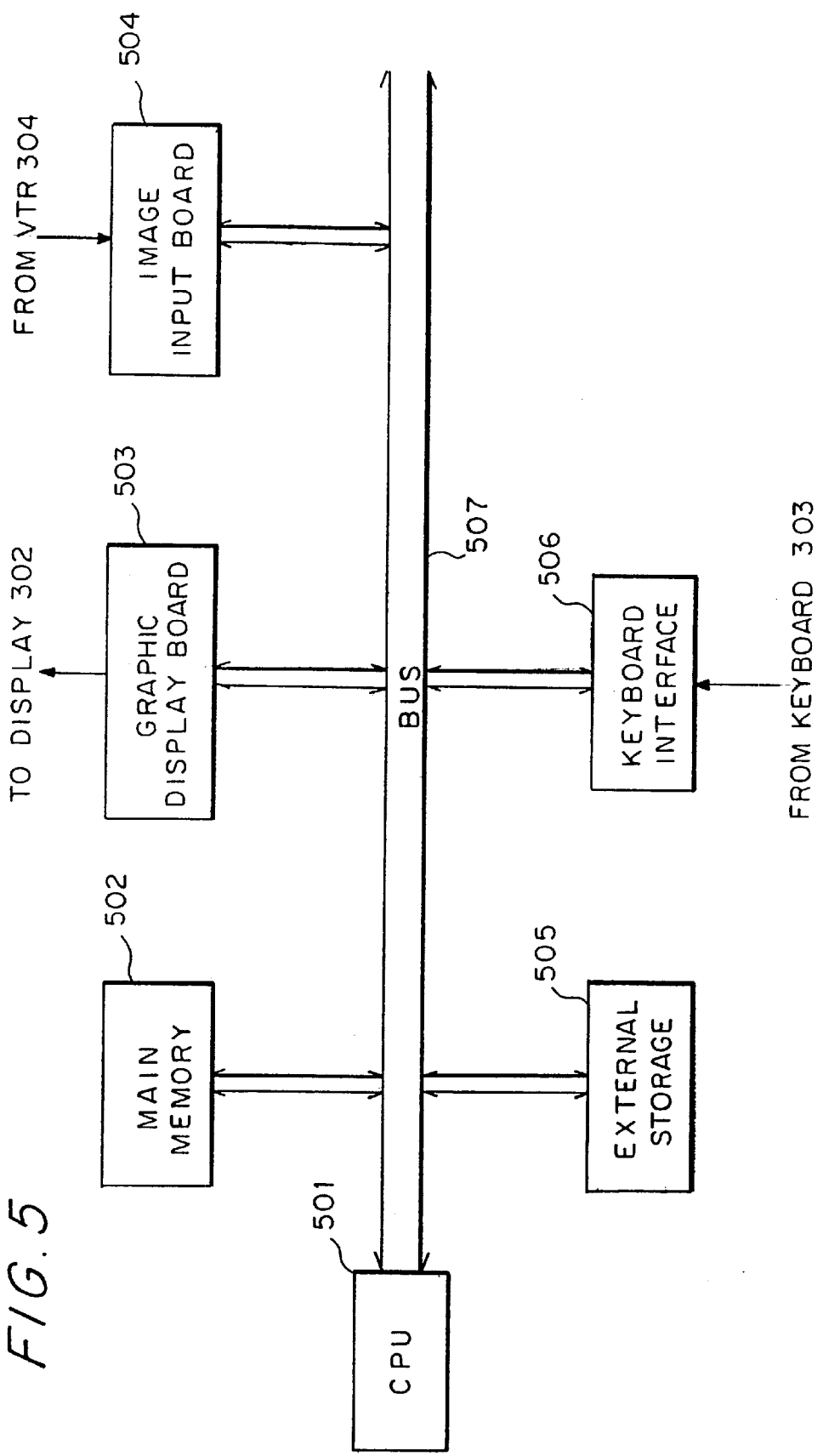
FIG. 5 is a block diagram showing the configuration of PC301.

Next, the description will be made of the configuration of the PC301 with reference to FIG. 5. FIG. 5 is a block diagram showing the configuration of PC301.

The PC301 is composed of a CPU (Central Processing Unit)501, a main memory 502, a graphic display board 503, an image input board 504, an external storage 505, a keyboard interface 506 and bus 507 as shown in FIG. 5.

The CPU501 conducts the control and arithmetic function of the PC301. A process of displaying images and character information on the display 302 is also realized when the CPU501 loads software accumulated in an external storage 505 into the main memory 502 and the software is executed. The software is loaded in the external storage 505 from a storage medium or via a network that is connected to a server. In other words, the CPU501 transfers the images contained in video signals from the image input board 504 to the graphic display board 503 to display the images by executing the software. It also transfers the images contained in video signals from the image input board 504 to the external storage 505 to record the images, and inputs character information contained in video signals, decodes the character information and transfers the decoded result to the graphic display board 503 to display the character information.

The main memory 502 is a storage using a semiconductor memory, etc., and is used to temporarily store a program or data to be executed by the CPU501.

The external storage 505 is a storage using a magnetic storage medium, etc., and is used for permanent retention of programs or data. As typical ones, there are HD (Hard Disk), FD (Floppy Disk), MO (Magnetic Optical Disk) and the like.

The graphic display board 503 is a module obtained by bringing together integrated circuits for conducting the function to display graphics into one board.

The image input board 503 is a module obtained by bringing together integrated circuits for inputting image data from the VTR304 into one board. In this respect, it is to be noted that the term "image data" is used to mean data generated by TV or VTR.

The keyboard interface 506 is an interface into which signals from the keyboard 303 are inputted.

A bus 507 is a passage for information to convey data or instruction to each portion of the system.

Figure 6:
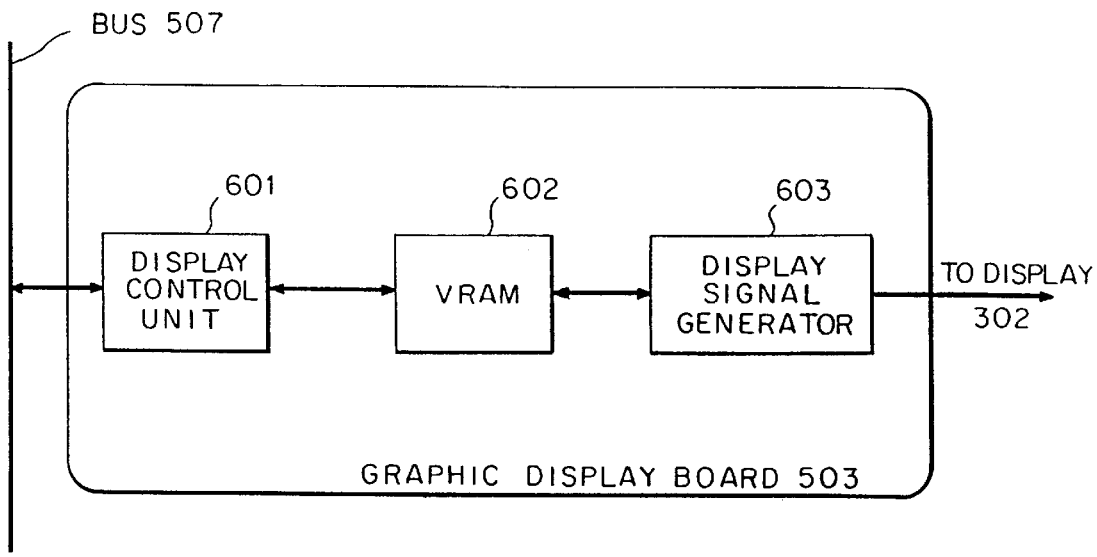
FIG. 6 is a block diagram showing the configuration of the graphic display board 503.

Subsequently, the description will be made of the configuration of each portion with reference to FIGS. 6 to 11. First, the graphic display board 503 will be described by using FIG. 6. FIG. 6 is a block diagram showing the configuration of the graphic display board 503.

The graphic display board 503 is composed of a display control unit 601, a VRAM602, and a display signal generator 603 as shown in FIG. 6.

The display control unit 601 is used to write data, in VRAM602, outputted by the CPU501 or the image input board 504 through bus 507, and for example, general parts on the market, LSI called display accelerator chip can be used.

The VRAM (Video Random Access Memory) 602 is a storage using a semiconductor memory or the like.

In the VRAM602, graphic data displayed on the screen are stored in the bit map form.

A display signal generator 603 successively reads data written in the VRAM602, and converts the data into display signals to output to the display 302, and IC, general parts on the market, can be used.

Next, the image input board 504 will be described by using FIGS. 7 to 11.

Figure 7:
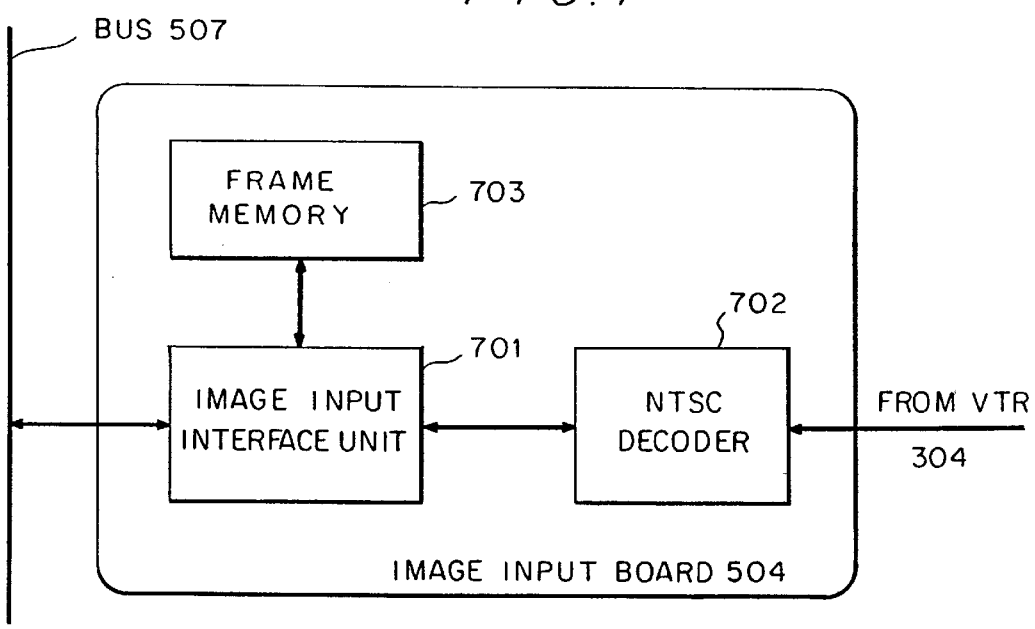
FIG. 7 is a block diagram showing the configuration of the image input board 504.

FIG. 7 is a block diagram showing the configuration of the image input board 504.

The image input board 504 is composed of an image interface unit 701, a NTSC decoder 702 and a frame memory 703.

The NTSC decoder 702 receives a designated image size from the CPU501 to input video signals from the VTR304. It digitizes the video signals to generate digital video data having the image size, and to output the digital video data to the image interface unit 701. In this NTSC decoder 702, LSI, general parts on the market, can be used.

In this respect, for example, a format YUV422 is used as a color format for digital video data, and in this format, the data for two pixels arranged in the horizontal direction are represented by eight bits data each for Y1 (brightness), Y2 (brightness), U (color difference 1) and V (color difference 2).

The frame memory 703 is a storage using semiconductor memory, etc. provided particularly to store image data.

Next, the image input interface unit 701 in the image input board 504 will be described in more detail by using FIG. 8.

Figures 8, 9:
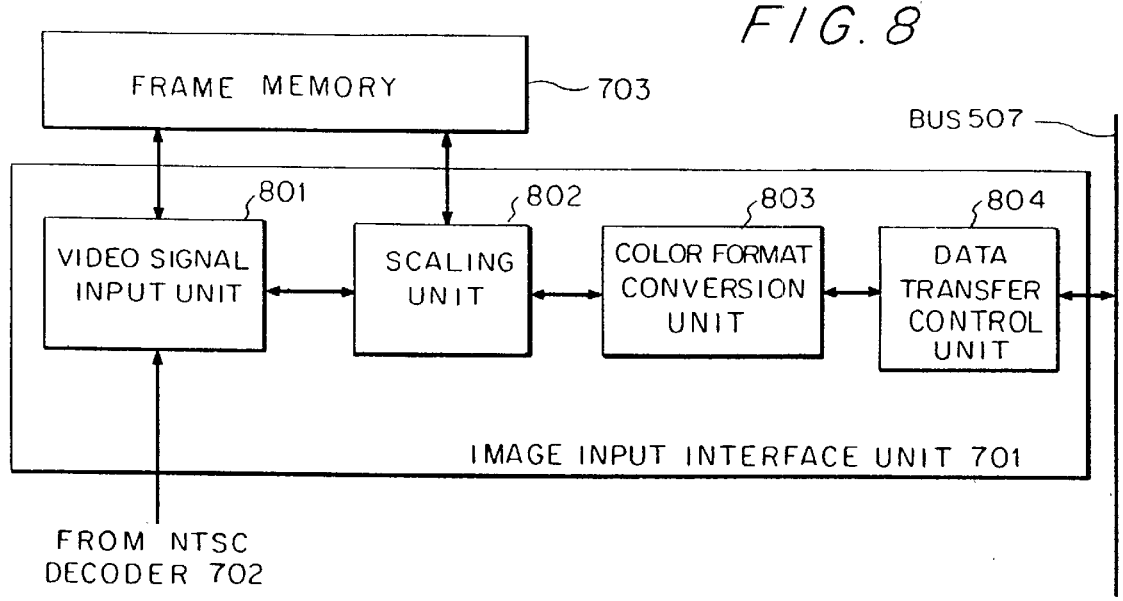
FIG. 8 is a block diagram showing the configuration of the image input interface unit 701.
FIG. 9 is a schematic view showing an example of a control plane.

FIG. 8 is a block diagram showing the configuration of the image input interface unit 701. In this respect, making this image input interface unit 701 into LSI enables the image input board 504 to be miniaturized and to have lower power consumption.

The image input interface unit 701 is composed of a video signal input unit 801, a scaling unit 802, a color format conversion unit 803 and a data transfer control unit 804.

The video signal input unit 801 inputs digital video data from the NTSC decoder 702, and writes, of the digital video data, a line designated by the CPU501 in the frame memory 703.

The scaling unit 802 reads digital video data from the frame memory 703, and scales the digital video data to output to the color format conversion unit 803. The term "scaling" is used to mean compressing or filling of data so that the digital video data can be displayed in such screen size as designated as pixel of actual display screen. Also, a ratio designated for this scaling is called scaling ratio.

At this time, when there is outputted a vertical blanking interval data transfer signal (as described later) corresponding to the field which is currently being transferred from the data transfer control unit 804, the scaling unit 802 does not scale eight lines at the head of the field, but outputs to the color format conversion unit 803, and at the same time, outputs an identification signal indicating that the data are retrace line data in synchronism with the data.

Also, when there is not outputted a vertical blanking interval data transfer signal (as described later) corresponding to the field which is currently being transferred from the data transfer control unit 804, the scaling unit 802 scales all lines of the field to a size designated by the CPU501, outputs the scaling result to the color format conversion unit 803, and does not output any identification signal indicating vertical blanking interval data.

The color format conversion unit 803 converts the color format of data inputted from the scaling unit 802 to output to the data transfer control unit 804.

At this time, when an identification signal indicating the vertical blanking interval data is outputted from the scaling unit 802, the color format conversion unit 803 does not convert the data from the scaling unit 802, but outputs to the data transfer control unit 804.

On the other hand, when no identification signal indicating vertical blanking interval data is outputted, the color format conversion unit 803 converts data from the scaling unit 802 into a color format designated by the CPU501 to output to the data transfer control unit 804.

Further, the color format conversion unit 803 outputs a line end signal to the data transfer control unit 804 in synchronism with the output of final data in each line.

(III) Configuration of Data Transfer Control Unit

Next, the configuration of the data transfer control unit 804 in the image input interface unit 701 will be described in more detail with reference to FIGS. 9 to 11.

FIG. 9 is a schematic view showing an example of the control plane.

FIG. 10 is a schematic view showing the configuration of the data transfer control unit 804.

FIG. 11 is a schematic view showing the configuration of the line transfer control register.

The data transfer control unit 804 shown in FIG. 8 controls so as to sequentially write the data from the color format conversion unit 803 to addresses specified in a control information table (hereinafter, referred to as control plane) indicating data forwarding addresses.

The control plane 901 is provided for a main memory 502 by the CPU 501 in advance, and the transfer size and head forwarding address of the line are written in by the CPU 501 for each line of the video signals as shown in FIG. 9.

The data transfer control unit 804 is composed of a control plane read-out control unit 1001, an address initialization control unit 1002, an address generator 1003 and a buffer 1004 as shown in FIG. 10.

The address generator 1003 is composed of a selector 1005, an address register 1006, an adder 1007 and a counter 1008 as shown in FIG. 10.

The address register 1006 includes various registers such as a head forwarding address register, a control plane read-out address register, a vertical size register, a horizontal size register and a line transfer control register though not shown in the figure.

The counter 1008 includes a vertical size counter and a horizontal size counter though not shown in the figure.

The line transfer control register is composed of 16 bits of line transfer control bit as shown in FIG. 11, and is provided within the data transfer control unit 804.

For this line transfer control bit, there exists 1 bit for each line for vertical blanking interval data from the 14th line to the 21st line of an odd field, and from the 277th line to the 284th line of an even field.

The line transfer control bit is determined in such a manner that, for example, 1 indicates that the line concerned is transferred, and that 0 indicates that the line concerned is not transferred.

The data transfer control unit 804 generates a vertical blanking interval data transfer signal in accordance with the respective line transfer control register values. The vertical blanking interval data transfer signal generated consists of two signals: an odd field vertical blanking interval data transfer signal and an even field vertical blanking interval data transfer signal.

The odd field vertical blanking interval data transfer signal transfers data when there is a bit, which is set to 1, in each bit from the 14th line to the 21st line of the odd field, of the transfer control registers.

Similarly, the even field vertical blanking interval data transfer signal transfers data when there is a bit, which is set to 1, in each bit from the 277th line to the 284th line of even field, of the transfer control registers.

(IV) Operation of Data Transfer Control Unit

Next, the operation of the data transfer control unit 804 in the image input interface unit 701 will be described in more detail with reference to FIG. 12.

Figure 12:
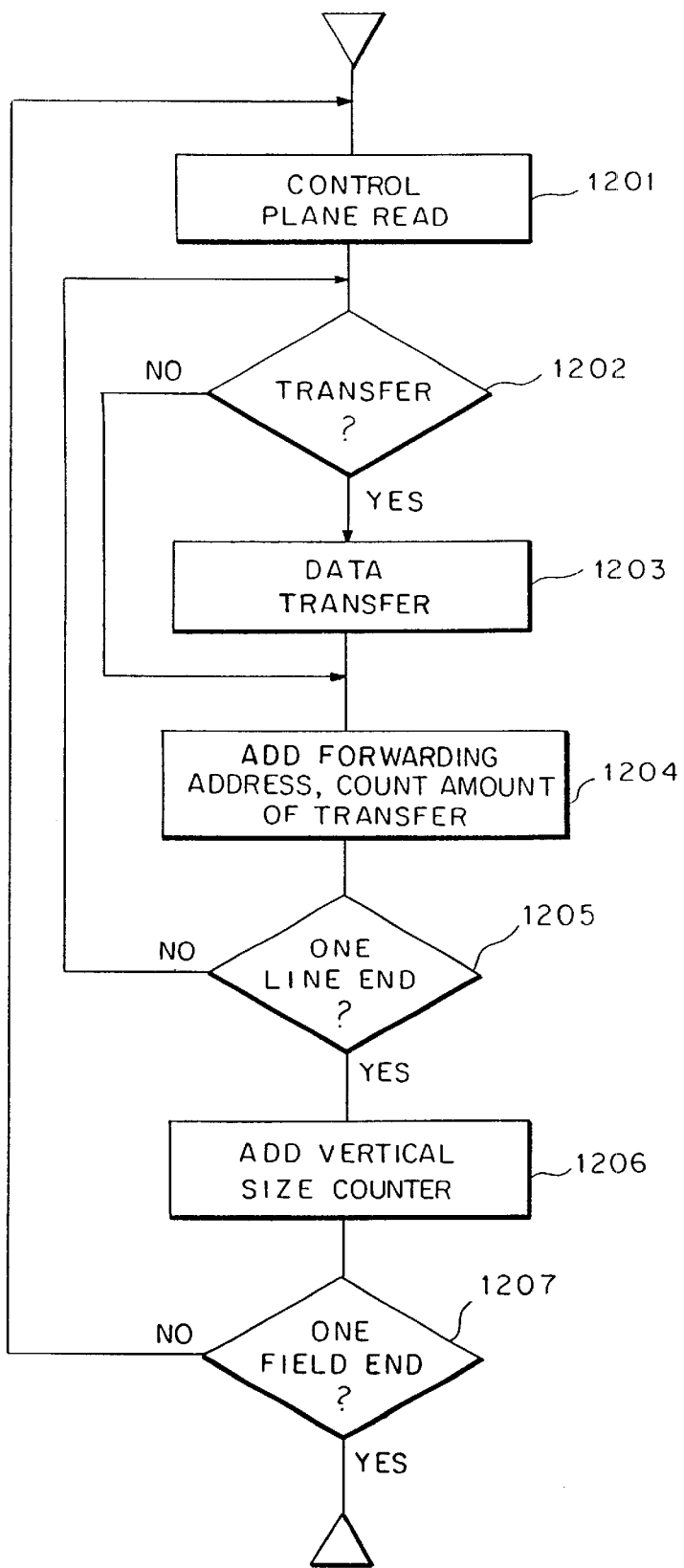
FIG. 12 is a flow chart showing the procedure of data transfer process performed by the data transfer control unit 804.

FIG. 12 is a flowchart showing the procedure of a data transfer process performed by the data transfer control unit 804. This procedure can be controlled by a sequencer, not shown, provided in the data transfer control unit 804 or the image input interface unit 701. The procedure is also representative of a computer program executable by a CPU.

Hereinafter, the procedure of the data transfer performed by the data transfer control unit 804 will be described following the sequence of FIG. 12 referring to FIGS. 10 and 11.

Data from the color format conversion unit 803 shown in FIG. 10 are inputted as occasion arises. The data transfer control unit 804 stores the data inputted in the buffer 1004.

The data transfer control unit 804 reads a pair of head forwarding address and transfer size from the control plane to store the head forwarding address thus read in the forwarding address register within the address register 1006, and the transfer size thus read in the horizontal size register respectively.

Thus, the control plane address register value is added in such a manner that the next pair of head forwarding address and transfer size can be read, and 0 is set in the horizontal size counter (Step 1201).

Next, the state is judged (Step 1202) by referring to the transfer control register every time the buffer 1004 is filled with data from the color format conversion unit 803, or a line end signal is inputted from the color format conversion unit 803.

As a result, when a line being currently transferred is a vertical blanking interval line, and a transfer control bit corresponding to the line being currently transferred is 1, and when the line being currently transferred is an image line, the Step 1203 is executed.

When the line being currently transferred is a vertical blanking interval line, and a transfer control bit corresponding to the line being currently transferred is 0, the process will proceed to Step 1204.

In this respect, in Step 1202, as regards judgement whether or not the line being currently transferred is a vertical blanking interval line, when there exists bit, which has been set to 1, 1 bit or more in the transfer control register corresponding to the field being currently transferred in the transfer control register, eight lines at the head of each field being currently transferred are identified as vertical blanking interval lines.

In Step 1203, the data stored in the buffer 1004 are transferred in order from addresses indicated by the forwarding address register through the bus 507.

In Step 1204, the data forwarding address register value and the horizontal size counter value are incremented by the size of the buffer 1004 respectively using the adder 1007.

Next, the horizontal size counter value is compared with the horizontal size register value (Step 1205). When both values are the same, the process will proceed to Step 1206, and when both values are not the same, the process will return to Step 1202.

In Step 1206, the vertical size counter value is set to +1, and the horizontal size counter value is set to 0.

Next, the vertical size counter value is compared with the vertical size register value (Step 1207). When both values are not the same, the Step 1201 will be executed, and when both values are the same, the transfer by one field has been finished.

(V) Processing of Character Information Data using CPU 501

Next, the processing of character information data using CPU 501 will be described with reference to FIG. 13.

Figures 13, 14:
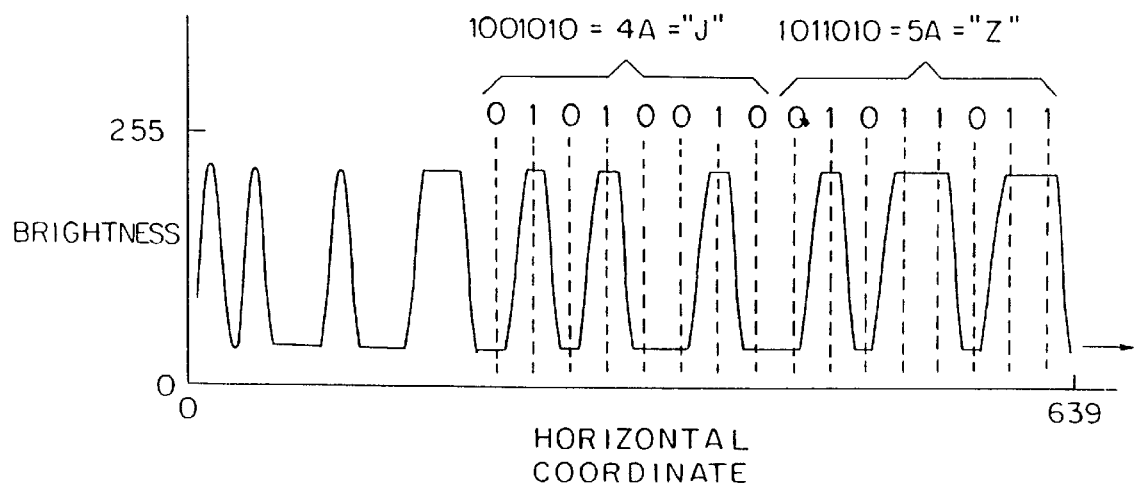
FIG. 13 is a schematic view showing signals of character information data for one line.
FIG. 14 is a schematic view showing a control plane for odd field set by the an embodiment according to the present invention.

FIG. 13 is a schematic view showing signals for one line of character information data.

The character information data for one line consist of 640 pixels of brightness signals, and the brightness signal of one pixel is represented by eight bits.

The character information data of this embodiment are supposed to be "JZ" as shown in FIG. 13.

The CPU 501 converts, by software processing, character information data into character data, and further converts the character data into graphic data to transfer the graphic data to a graphic display board 503 through bus 507.

(VI) Operation of This System for Displaying Video Data

Finally, an operation of an image display system according to this embodiment for displaying video data will be described with reference to FIGS. 14 to 16.

In this embodiment, the following cases will be described concretely. Images from the 22nd line to the 263rd line of an odd field are converted into 320 pixels width×240 pixels length of RGB 16 bit color in which 1 pixel is represented by six bits, five bits and five bits of data of R, G and B (red, green, blue) respectively to display on a display 302, and the 21st line vertical blanking interval data of an odd field are converted into character data to display on the display 302. On the other hand, images from the 285th line to the 525th line of an even field are converted into 160 pixels width×120 pixels length of RGB 24 bit color in which 1 pixel is represented by eight bits each of data of R, G and B respectively to store in the external storage 505.

It is to be noted that data of even field are not displayed on the display 302, but are only stored in the external storage 505 as data.

In this respect, an image input interface unit 701 is to play a central part in this processing.

(VI-1) Setting of Each Unit of CPU 501

First, the CPU 501 is to set each unit such as a NTSC decoder 702 in the image input board 504 through the bus 504, a video signal input unit 801 in the image input interface unit 701, a scaling unit 802 and a color format conversion unit 803, and a data transfer control unit 804.

In a NTSC decoder 702, the output start line of an odd field is set to the 14th line, the output end line to the 263rd line, the output start line of an even field to the 285th line, and the output end line to the 525th line, and a number of pixels per line is set to 640 pixels.

In a video signal input unit 801, lines to be written in the frame memory are set.

In this embodiment, the write start line of an odd field is set to the 14th line, the write end line to the 263rd line, the write start line of an even field is set to the 285th line, the write end line to the 525th line respectively.

In a scaling unit 802, the image size is set.

In this embodiment, the image size of an odd field is set to 320 pixels width×240 pixels length, and the image size of an even field to 160 pixels width×120 pixels length respectively.

In a color format conversion unit 803, a color format is set.

In this embodiment, the odd field is set to RGB 16 bit color, and the even field is likewise set to RGB 24 bit color.

In a data transfer control unit 804, a data forwarding size, a data forwarding address, a vertical blanking interval data to be transferred, a vertical size, a head address of a control plane are set.

The data forwarding size and the data forwarding address are set using the control plane.

The vertical blanking interval data to be transferred, the vertical size, and the head address of the control plane are set by using a transfer control register, a vertical size register and a control plane address register respectively.

(VI-2) Setting of Control Plane

Next, setting of the control plane in this embodiment will be described with reference to FIGS. 14 and 15.

FIG. 14 is a schematic view showing a control plane for an odd field to be set in a first embodiment of the present invention.

FIG. 15 is a schematic view showing a control plane for an even field to be set in a first embodiment of the present invention.

The control plane is a table having a pair of the transfer size and the forwarding address for each horizontal line as already explained, and is used to set the transfer size and forwarding address of the data transfer control unit 804.

In this embodiment, the control plane of an odd field is as shown in FIG. 14, and the control plane of an even field is as shown in FIG. 15 under the supposed conditions.

In FIGS. 14 and 15, the head forwarding address and transfer size are values represented by hexadecimal number. The transfer size is a value represented in byte.

1401 to 1403 in FIG. 14, and 1501 to 1503 in FIG. 15 designate the forwarding address and transfer size of vertical blanking interval data, and 1404 to 1406 in FIG. 14 and 1504 to 1506 in FIG. 15 designate the forwarding address and transfer size of the image data.

(VI-3) Setting of Transfer Control Register

Next, the setting of the transfer control register in this embodiment will be described by using FIG. 16.

FIG. 16 is a schematic view showing a transfer control register to be set in the first embodiment of the present invention.

The transfer control register was a register for holding a bit indicating presence or absence of transfer for each horizontal line. In this embodiment, the transfer control register is set as shown in FIG. 16.

The character data of CC system are multiplexed to the 21st line as described already. To this end, the transfer control register sets only a bit corresponding to the 21st line to 1, and sets all remaining bits to 0.

Since only a transfer control bit of the 21st line of the odd field has been set to 1, the data transfer control unit 804 outputs a vertical blanking interval data transfer signal for odd fields to the scaling unit 802, and does not output a vertical blanking interval data transfer signal for even fields.

(VI-5) Operation of Image Input Interface Unit

On the basis of the above-described conditions, the operation of the image input interface unit 701 of this embodiment will be described.

The video signal input unit 801 inputs digital video data from the 14th line to the 263rd line of an odd field, and from the 285th line to the 525th line of an even field from the NTSC decoder, and writes the data in the frame memory 703.

Subsequently, the scaling unit 802 does not scale the vertical blanking interval data from the 14th line to the 21st line of an odd field, of the data read from the frame memory, but scales the image data from the 22nd line to the 263rd line of an odd field to 320 pixels width×240 pixels length to output to the color format conversion unit 803.

On the other hand, image data from the 285th line to the 525th line of an even field are scaled to 160 pixels width× 120 pixels length to output to the color format conversion unit 803.

The color format conversion unit 803 does not color format convert the vertical blanking interval data from the 14th line to the 21st line of an odd field from the scaling unit 802, but color format converts the data from the 22nd line to the 263rd line of an odd field to RGB 16 bit color to output to the data transfer control unit 804.

The data from the 285th line to the 525th line of an even field are color format converted into RGB 24 bit color to output to the data transfer control unit 804.

The data transfer control unit 804 outputs image data from the 22nd line to the 263rd line of an odd field received from the color format conversion unit 803 to VRAM602 in the graphic display board 503 to output the vertical blanking interval data of the 21st line of an odd field to a main memory 502.

Also, image data from the 285th line to the 525th line of an even field are outputted to the main memory 502.

Image data written in the VRAM602 are converted into display signals by the graphic display board 503. Thereby, the images will be displayed on the display 302.

The image data of the even field written in the main memory 502 are transferred to the external storage 505 by the CPU 501. Then, the external storage 505 records the image data.

The vertical blanking interval data of the odd field written in the main memory 502 are decoded by the CPU 501, and are transferred to the graphic display board 503. As a result, characters will be displayed on the display 302.

By repeating the process described above, images from the 22nd line to the 263rd line of an odd field are converted into 320 pixels width×240 pixels length, RGB 16 bit color to be displayed on the display 302, and the vertical blanking interval data of the 21st line of an odd field are converted into character data to be displayed on the display 302.

The software executed by the CPU 501 enables that the windows for displaying the images and the character data are displayed separately and that a user of the pc301 controls the positions of the windows.

At the same time, images from the 285th line to the 525th line of an even field are converted into 160 pixels width×120 pixels length, RGB 24-bit color to be stored in the external storage 505.

(VII) Relationship between Bus and Data Transfer

When the bus 507 is used in common for display of images or other processes than display of character information or when the data transfer ability of the bus 507 is low, there are some cases where transfer of data through a bus is not completed within the time for one field, and images of all fields and vertical blanking interval data cannot be transferred.

In such a case, it is effective to temporarily stop the display or transfer of the images for recording, and to control so as to transfer only the vertical blanking interval data.

The reason why the vertical blanking interval data are given priority is that when character information lacks information for one field, data for two characters are lost, which is likely to cause the meaning of the entire caption not to be understood, but in the case of image display, even if it lacks the information for one field, we hardly perceive it by human visual sensation and little or no influence is exerted.

In an image input board 504 according to the present invention, since the range of data to be transferred can be changed by setting, such control as described above can be realized by setting the range of data to be transferred for each field.

When, for example, it takes time to transfer data in a certain field and the traffic of bus is judged to be high, the next field is so set as to transfer only the vertical blanking interval data.

(VIII) Special Features of This Embodiment

According to the an embodiment described above, it is possible to display, on the display, the images contained in the video signals, in which character information has been multiplexed, and the character information at the same time, and to record the images in a storage.

At this time, since digital video data are directly transferred to the graphic display board through a bus by the image input board 504, it is possible to increase the amount of data transferred per unit time and to display high quality image.

Images recorded in a storage are reduction scaled in the image input board 504. By thus performing, on the image input board 504, reduction scaling or data conversion which reduces the amount of data such as color format conversion which reduces the amount of data per pixel, it is possible to reduce the amount of data to be transferred through a bus, and to thereby make the traffic of bus lower.

Also, since the CC data are decoded by means of software, it is possible to make the device lower-priced, smaller in size, and to reduce its power consumption as compared with when hardware for exclusive use in CC decoding is used.

Further, scaling process and color format conversion process that need many arithmetic operations are performed by using the image input board. Accordingly, the CPU can be used only for decoding character information and transferring data to the storage, and also can record high-quality images at high speed.

Graphics data processed by the graphics display board other than the CC data or the image data can be displayed on the display screen simultaneously.

Hereinafter, another embodiment according to the present invention will be described by using FIGS. 17 to 19. In the embodiment described above, the scaling process and color format conversion process were performed by using the image input board 504.

In contrast to this, in this second embodiment, these scaling process and color format conversion process were performed by using the graphic display board 503.

The hardware configuration of an image display system of the embodiment is that the image input board 504 of the first embodiment shown in FIG. 1 is replaced with the image input board to be described later.

(I) Processes by Graphic Display Board 503

First, the processes performed by the graphic display board 503 in this embodiment will be described.

The graphic display board 503 in this embodiment performs the scaling process and color format conversion process performed by using the image input board 504 in the above-described embodiment.

A display control unit 601 in the graphic display board 503 as shown in FIG. 6 inputs graphic data, scaling ratio, input color format and output color format from the CPU501, and digital video data from the image input board 504 through a bus 507 respectively.

The input color format shows a color format for digital video data inputted from the image input board 504, and the output color format shows a color format displayed on the display 302.

The graphic display board 503 in this embodiment is different from the above-described embodiment in the operation of the display control unit 601, and color format converts this digital video data into a color format designated by the output color format, further scales at a scaling ratio designated, and writes the scaling result in the VRAM602.

The graphic data are neither color format converted nor scaled, but are written in the VRAM602.

The operations of the VRAM602 and display signal generator 603 are the same as in the above-described embodiment.

(II) Configuration of Image Input Board 504

Next, the configuration of an image input board 504 according to this embodiment will be described by using FIGS. 17 and 18.

FIG. 17 is a block diagram showing the configuration of an image input board according to the embodiment of the present invention.

FIG. 18 is a block diagram showing the configuration of an image input interface unit 1701 according to the embodiment of the present invention.

The image input board of the second embodiment is composed of the image input interface unit 1701 and a NTSC decoder 1702 as shown in FIG. 17.

The NTSC decoder 1702 is the same as the NTSC decoder 702 of the above-described.

This embodiment is different from the first embodiment in the image interface unit 1701, and this configuration will be described in detail below.

The image interface unit 1701 in the embodiment is composed of a video signal input unit 1801 and a data transfer control unit 1802.

The video signal input unit 1801 of the above-described embodiment outputted digital video data to the frame memory, but the video signal input unit 1801 according to this embodiment outputs the digital video data to the data transfer control unit 1802 instead of the frame memory.

The data transfer control unit 1802 of the first embodiment inputted data from the color format conversion unit 803, but the data transfer control unit 1802 of this embodiment inputs data from the video signal input unit 1801 instead of the color format conversion unit 803.

(III) Processing Character Information Data

The decoding process and display process of character information data in this embodiment are the same as those in the above-described embodiment respectively.

(IV) Operation of This System for Displaying Video Data

Next, the operation of an image display system according to this embodiment for displaying video data will be described by using FIG. 19.

In this embodiment, the concrete description will be made of a case where images from the 22nd line to the 263rd line of an odd field are converted into 1024 pixels width×768 pixels length, RGB 24 bit color, and are displayed on the display 302, and the vertical blanking interval data of the 21st line of an odd field are decoded to display on the display 302.

In this respect, the image input interface unit 701 is also to play a central part here.

(IV-1) Setting of Each Unit by CPU501

First, the CPU501 sets the NTSC decoder 1702 in the image input board 504, the video signal input unit 1801 in the image input interface unit 1701, the data transfer control unit 1802 and the graphic display board 503 through the bus 504.

In the NTSC decoder 1702, the start line of the odd field is set to 14, the end line is set to 263, the even field is so set as not to output, and the number of pixels per line is set to 640 pixels.

In the video signal input unit 1801, a line outputted to the data transfer control unit 1802 is set.

In this embodiment, the start line of the odd field is set to 14, the end line is set to 263, and the even field is so set as not to output.

In the data transfer control unit 1802, the data forwarding size, data forwarding address, vertical blanking interval data to be transferred, vertical size, and head address of control plane are set.

The data forwarding size and data forwarding address are set by using the control plane.

The vertical blanking interval data to be transferred, vertical size, and head address of control plane are set by using the transfer control register, vertical size register and control plane address register respectively.

The setting of the data transfer control unit 1802 of this embodiment is the same as in the above-described embodiment except the control plane.

In the graphic display board 503, the size, input color format and output color format are set.

In this embodiment, the size is set to 1024 pixels width×768 pixels length, the input color format to YUV422, and the output color format to RGB 24 bit color respectively.

(IV-2) Setting of Control Plane

Next, setting of the control plane in this embodiment will be described by using FIG. 19.

FIG. 19 is a schematic view showing a control plane of an odd field to be executed in this embodiment according to the present invention.

In this embodiment, the control plane of an odd field becomes as shown in FIG. 19 under the supposed conditions. In this respect, in the second embodiment, since the vertical blanking interval data of an even field and the image data are not transferred, it is not necessary to set the control plane for an even field.

In FIG. 19, the head forwarding address and the transfer size are values represented by hexadecimal number. The transfer size is a value represented in byte.

1901 to 1903 in FIG. 19 designate the head forwarding address and the transfer size of vertical blanking interval data of horizontal line No. to which these correspond respectively.

(IV-3) Operation of Image Input Interface Unit

On the basis of the above-described conditions, the operation of the image input interface unit 1701 in this embodiment will be described.

The video signal input unit 1801 shown in FIG. 18 inputs digital video data from the NTSC decoder 1702, and of the digital video data thus inputted, a line designated by the CPU 501 is outputted to the data transfer control unit 1702.

The data transfer control unit 1802 transfers image data from the 22nd line to the 263rd line of an odd field from the video signal input unit 1801 to the graphic display board 503, and transfers the vertical blanking interval data of the 21st line to the main memory 502.

The graphic display board 503 converts image data inputted from the data transfer control unit 1802 into 1024 pixels width×768 pixels length, RGB 24 bit color to write in the VRAM602.

The image data written in the VRAM602 are converted into display signals by the graphic display board 503 to display on the display 302.

The vertical blanking interval data of an odd field written in the main memory 502 are decoded by the CPU 501, transferred to the graphic display board 503, and displayed on the display 302.

In this respect, in the first embodiment, in order to store the image data in the external storage 505, the data was also transferred to the main memory 502, but it is to be noted that in this embodiment, the data are transferred only to the VRAM602.

By repeating the process described above, images from the 22nd line to the 263rd line of an odd field are converted into 1024 pixels width×768 pixels length, RGB 24 bit color to be displayed on the display 302, and the vertical blanking interval data of the 21st line of an odd field are decoded, and after converted into character data, further converted into graphic data to be displayed on the display 302.

(V) Special Features of This Embodiment

According to the second embodiment described above, the images and character information which are contained in the video signals, in which character information has been multiplexed, can be simultaneously displayed on a display connected to the PC.

At this time, since digital video data are directly transferred to the graphic display board through a bus by the image input board, it is possible to increase the amount of data transferred per unit time and to display high quality image.

Also, the scaling process and color format conversion are performed by using the graphic display board. By thus performing, by using the graphic display board, enlarge scaling or the data conversion which increases the amount of data such as color format conversion which increases the amount of data per pixel, the data whose amount has been increased are caused not to pass through the bus, but the traffic of bus can be prevented from being increased.

Further, scaling process for images and color format conversion process that need many arithmetic operations are performed by using the graphic display board. Accordingly, the CPU can be used only for decoding CC data.

This embodiment forms a contrast with the process in which the amount of data reduces by reduction scaling in the first embodiment. Also, when the amount of data reduces by color format conversion or scaling of image data, scaling and color format conversion are respectively performed, as in the first embodiment, by using the scaling unit 802 and the color format conversion unit 803 which are within the image input interface unit 701 of the image input board 504 respectively. On the contrary, when the amount of data increases by color format conversion or scaling of image data, the color format conversion and scaling of the image data can be performed by the display control unit 601 in the graphic display board 503 as in the embodiment.

In this embodiment, since CC data are decoded by means of software in the same manner as in the above-described embodiment, it is possible to make the device lower-priced, and smaller in size, and to reduce its power consumption as compared with when hardware for exclusive use in CC decoding is used.

Further in this embodiment, since the configuration of the image interface unit on the image input board is simple and no frame memory is required, the configuration becomes easier than that of the above-described embodiment, thus making it possible to make the device lower-priced and smaller in size with less power consumption.

Hereinafter, another embodiment according to the present invention will be described by using FIGS. 20 to 24. This embodiment shows an example in which processing of the vertical blanking interval data is described when the data classification of the vertical blanking interval data is unknown.

The hardware configuration and image data displaying process in this embodiment are the same as in the first of the above-described embodiments.

(I) Processing of Vertical blanking interval Data

The processing of vertical blanking interval data, which is the principal object of the processing in this embodiment, will be described using FIGS. 20 to 24.

Figures 20, 21A, 21B:
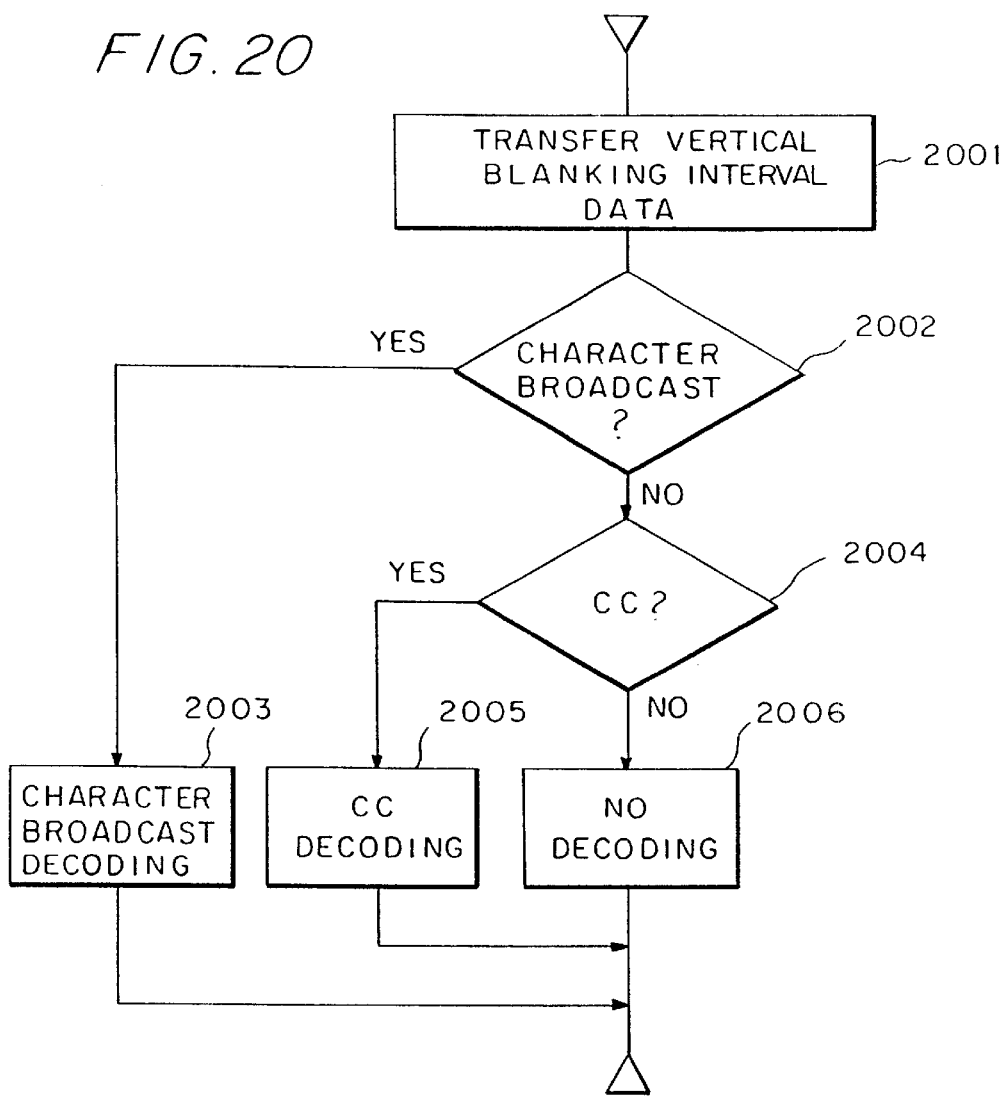
FIG. 20 is a flowchart showing the procedure of a vertical blanking interval data identification process according to yet another embodiment of the present invention.

FIG. 20 is a flow chart showing the procedure of vertical blanking interval data identification process according to this embodiment of the present invention.

FIG. 21 is a view showing a set value for the transfer control register of this embodiment of the present invention (Part 1).

FIG. 22 is a view showing a set value for the transfer control register of this embodiment of the present invention (Part 2).

FIG. 23 is a view showing a set value for the transfer control register of this embodiment of the present invention (Part 3).

FIG. 24 is a view showing a set value for the transfer control register of this embodiment of the present invention (Part 4).

In this embodiment, it is assumed that character information data are multiplexed to the vertical blanking interval by using the CC system or a character broadcast system (hereinafter, abbreviated simply to "character broadcast system") which has been in effect in Japan.

In this embodiment, since it has been supposed that the classification of the vertical blanking interval data is unknown, data classification distinguish process for the vertical blanking interval data must be performed before the character information data are displayed.

The distinguishing can be performed by using decode software which corresponds to the CC system or the character broadcast system respectively.

Accordingly, after the classification of the vertical blanking interval data is distinguished, the decode software which corresponds to the CC system or the character broadcast system respectively is to be used.

Hereinafter, this will be described in due order using FIG. 20. The flowchart shown in FIG. 20 shows a special feature portion of the present invention to be added to the existing program which displays image contained in video signals on PC. Reference numerals 2003 and 2005 designate subprograms having functions to be described later.

First, the vertical blanking interval data of the 14th, 15th, 16th and 21st lines of an odd field are transferred to the main memory by using the image input board 504 (Step 2001).

In this Step 2001, such transfer control register as shown in FIG. 21 is set.

Subsequently, the 14th, 15th, 16th and 21st lines are decoded by using the decoding software corresponding to the character broadcast system, and it is discriminated whether or not the decoded result becomes significant character data (Step 2002).

If the decoded result is significant characters, the Step 2003 is executed, and if not, the Step 2004 is executed.

If the decoded results are significant characters, the data multiplexed to the vertical blanking interval are identified as data multiplexed by using the character broadcast system. The transfer control register is set using set values shown in FIG. 22, and the image input board 504 is caused to transfer the vertical blanking interval data of the 14th, 15th, 16th and 21st lines of an odd field and the 277th, 278th, 279th and 285th lines of an even field to the main memory 502. Further in this case, the decoding software corresponding to the character broadcast system will be used thereafter to decode the vertical blanking interval data (Step 2003).

If the decoded results are insignificant characters, the 21st line is decoded by using the decoding software corresponding to the CC system to discriminate whether or not the decoded results become significant character data. If the decoded results are significant characters, the Step 2005 is executed, and if not, Step 2006 is executed (Step 2004).

If the decoded results are significant characters, the data multiplexed to the vertical blanking interval are identified as data multiplexed by using the CC system. The transfer control register is set by using set values shown in FIG. 23, and the image input board 504 is caused to transfer the vertical blanking interval data of the 21st line of an odd field to the main memory 502. Further in this case, the decoding software corresponding to the CC system will be used thereafter to decode the vertical blanking interval data (Step 2005).

If the decoded results are insignificant characters, the data are identified as data not multiplexed to the vertical blanking interval. The transfer control register is set by using set values shown in FIG. 24, and the image input board 504 prevents the vertical blanking interval data from being transferred to the main memory 502 (Step 2006).

If it is known that the character information data are multiplexed by using the CC system or the character broadcast system, the description has been made of a method whereby the vertical blanking interval data are identified, only the line in which the data are multiplexed is transferred to the main memory 502, and the vertical blanking interval data are decoded.

Even when the character information data are multiplexed by using the CC system or other systems than the character broadcast system, it is possible to identify the vertical blanking interval data and to transfer only the line in which the data are multiplexed to the main memory 502 by using the same method.

Therefore, if the vertical blanking interval data identification process is performed before the images and vertical blanking interval data are transferred, and the process corresponding to the classification of the vertical blanking interval data is performed, it will be possible to display even character information multiplexed by using any system on a display together with images.

(II) Special features of This Embodiment

According to this embodiment, it is possible to display the images and the character information which are contained in video signals on a display connected to PC at the same time even if the system of multiplexing of character information to the vertical blanking interval is unknown.

According to this method, it is possible to cope with a plurality of character information multiplexing systems without forcing the user to designate the classification of the vertical blanking interval data, and to provide an image display device easy to use.

Since control can be performed in such a manner that of vertical blanking intervals, only lines in which character information data are multiplexed are transferred, and that the lines in which character information data are not multiplexed are not transferred, it is possible to prevent the traffic of bus from being increased as compared with when this control is not performed.

Further, even when a new system of multiplexing of data to the vertical blanking interval appears, this system of the embodiment is capable of coping with it at low cost only by changing the software without replacing it.

According to the present invention, when superimposing video data such as images on character information to display on a graphic display screen, design is made such that an appropriate process can be performed in accordance with the property of the data, and therefore, it is possible to provide a video data processing device and a video data display device which are small-sized and low-priced with less power consumption without lowering the display performance as the entire system.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. Information processing system, comprising;

a bus;

a central processing unit (CPU);

a first scaling unit which is coupled to said bus and has input means for inputting image data from an external device; and a second scaling unit which is coupled to said bus, wherein said CPU selectively controls said first scaling unit to convert said image data when an amount of said image data is decreased by a conversion performed by said first scaling unit, and selectively controls said second scaling unit to convert said image data when an amount of said image data is increased by the conversion performed by said first scaling unit.

2. A video data processing system, comprising:

a bus;

a central processing unit (CPU);

a first scaling unit which is coupled to said bus and has input means for inputting image data from an external device;

a second scaling unit which is coupled to said bus; and a display unit which is coupled to said second scaling unit, wherein said CPU selectively controls said first scaling unit to convert said image data when a size of said image data is smaller than a display size of said display unit, and selectively controls said second scaling unit to convert said image data when said size of said image data is larger than said display size of said display unit.

3. A video data processing system according to claim 2, further comprising:

a memory which is coupled to said bus, wherein said CPU control said first scaling unit to output said image data to said memory when said size of said image data is smaller than said display size of said display unit.

4. A video data processing system, comprising:

a bus;

a central processing unit (CPU);

a first scaling unit which is coupled to said bus and has input means for inputting image data from an external device;

a second scaling unit which is coupled to said bus; and a display unit which is coupled to said second scaling unit;

wherein said CPU selectively controls said first scaling unit to convert said image data when a size of said image data is smaller than a display size of said display unit, and controls said first scaling unit to output said converted image data to said second scaling unit, and selectively controls said second scaling unit to output said converted image data to said display unit.

5. A video data processing system, comprising:

a bus;

a central processing unit (CPU);

a first scaling unit which is coupled to said bus and has input means for inputting image data from an external device;

a second scaling unit which is coupled to said bus; and a display unit which is coupled to said second scaling unit, wherein said CPU selectively controls said first scaling unit to output said image data to said second scaling unit when a size of said image data is larger than a display size of said display unit, and selectively controls said second scaling unit to convert said image data and to output said converted image to said display unit.

6. A video data processing system according to claim 5, wherein said first scaling unit and said second scaling unit have color conversion means.

* * * * *